May 9, 1939.    S. W. ROLPH    2,157,629
STORAGE BATTERY WITH UNIT INSULATION
Original Filed Aug. 29, 1934    3 Sheets-Sheet 1

INVENTOR.
SAMUEL W. ROLPH
BY
Kwis Hudson & Kent
ATTORNEYS

May 9, 1939.  S. W. ROLPH  2,157,629
STORAGE BATTERY WITH UNIT INSULATION
Original Filed Aug. 29, 1934   3 Sheets-Sheet 2
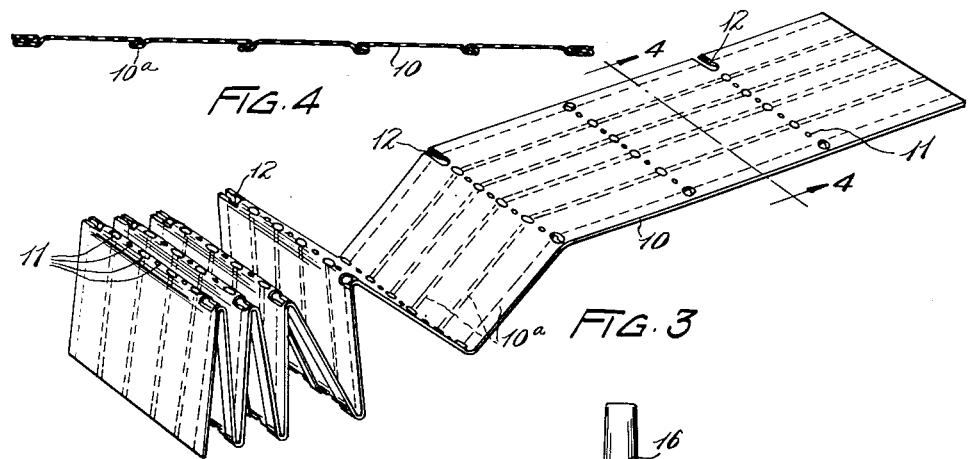
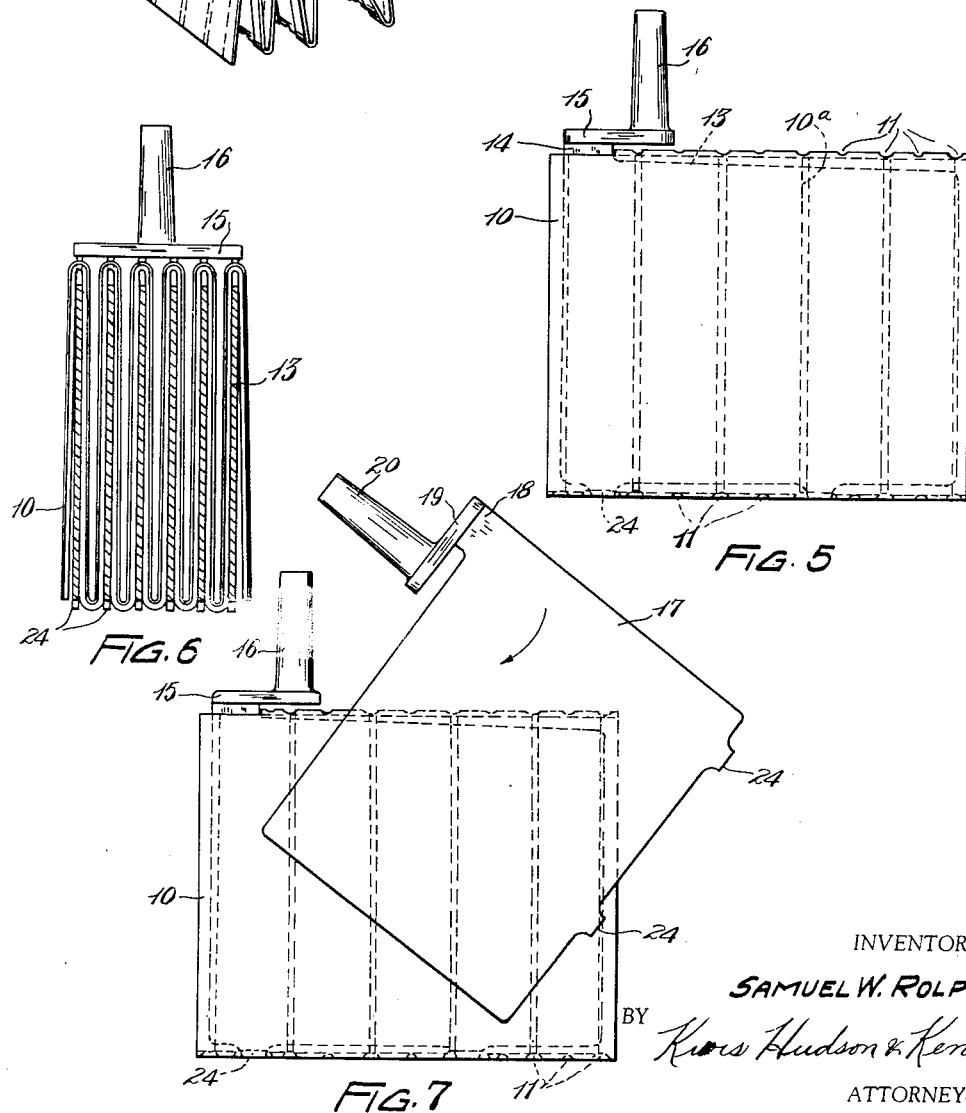
INVENTOR.
SAMUEL W. ROLPH
BY Kwis Hudson & Kent
ATTORNEYS May 9, 1939. S. W. ROLPH 2,157,629
STORAGE BATTERY WITH UNIT INSULATION
Original Filed Aug. 29, 1934 3 Sheets-Sheet 3

INVENTOR.
SAMUEL W. ROLPH
BY
Kwis Hudson & Kent
ATTORNEYS

Patented May 9, 1939

2,157,629

UNITED STATES PATENT OFFICE 2,157,629

STORAGE BATTERY WITH UNIT INSULATION

Samuel W. Rolph, Shaker Heights, Ohio, assignor to Willard Storage Battery Company, Cleveland, Ohio, a corporation of West Virginia Application August 29, 1934, Serial No. 741,957
Renewed January 25, 1938

8 Claims. (Cl. 136—147)

This invention relates to storage batteries and has particular reference to the insulation between the positive and the negative plates, this invention contemplating the use of unit insulation formed from porous separator material extending back and forth in the manner of accordion plaiting so that it can be installed in the battery element as a unit rather than as individual separators in use at the present time.

This unit insulation is preferably formed from a strip of suitable separator material which is folded back and forth so as to form substantially parallel adjacent leaves or sections adapted to be extended between the positive and negative plates of a battery element, but this unit insulation may be formed in other ways, as by molding the same from suitable insulating material in a manner such that the adjacent sections will either initially or when assembled in a battery element lie in substantial parallelism. While the insulation is generally made from a folded strip, the terms "folded", or "fold lines" or "lines of fold", unless otherwise limited, are intended herein to cover the junction portions between adjacent sections regardless of how the unit insulation is made. Likewise, the word "strip" as used in part of the claims is intended to be inclusive of the molded insulation.

This unit insulation may be made and applied in a manner such that it passes over the tops of the plates of one polarity, preferably the positive plates, and under the lower edges of the plates of opposite polarity, or it may be so formed and applied as to pass about the vertical or side edges of the plates, but if it is extended over and under the plates, as first stated, it is preferably perforated at the fold lines so as not only to facilitate the folding when the insulation is made by folding a continuous strip back and forth, but also to permit the escape of evolved gases from the plates over which the insulation passes.

An additional feature of this unit insulation is that the different sections thereof are provided with ribs which of course extend vertically and preferably are positioned next to the positive plates, as is the custom when individual separators are employed. If the unit insulation is designed to extend over and under the plates, these ribs will extend lengthwise of the strip, but if the insulation is formed so as to extend about the vertical or side edges of the plates, then the ribs will extend crosswise of the strip.

Further objects and numerous advantageous features of the invention will appear in the following description.

The invention may be further briefly summarized as consisting in certain novel combinations and arrangements of parts which will be described in the specification and set forth in the appended claims.

In the accompanying sheets of drawings wherein embodiments of the invention which operate very satisfactorily are illustrated, Fig. 1 shows a battery with one cell in section equipped with unit insulation formed and applied in accordance with the present invention, in its preferred form, the section of Fig. 1 being taken substantially along the line 1—1 of Fig. 2;

Fig. 3 illustrates a strip of separator or insulator material cut and perforated at intervals for folding and shows how the strip may be folded to form the unit insulation of Figs. 1 and 2.

Fig. 4 is a transverse sectional view through the strip substantially along the line 4—4 of Fig. 3;

Figs. 5, 6 and 7 illustrate the preferred way in which the assembly of plate groups and insulation may be made, Fig. 5 showing a side view of the unit insulation after the positive plates have been inserted therein, Fig. 6 being an end view of the same with the positive plates in section, and Fig. 7 illustrating the manner in which the plates of the negative group may be inserted in the assembly;

Figure 1:
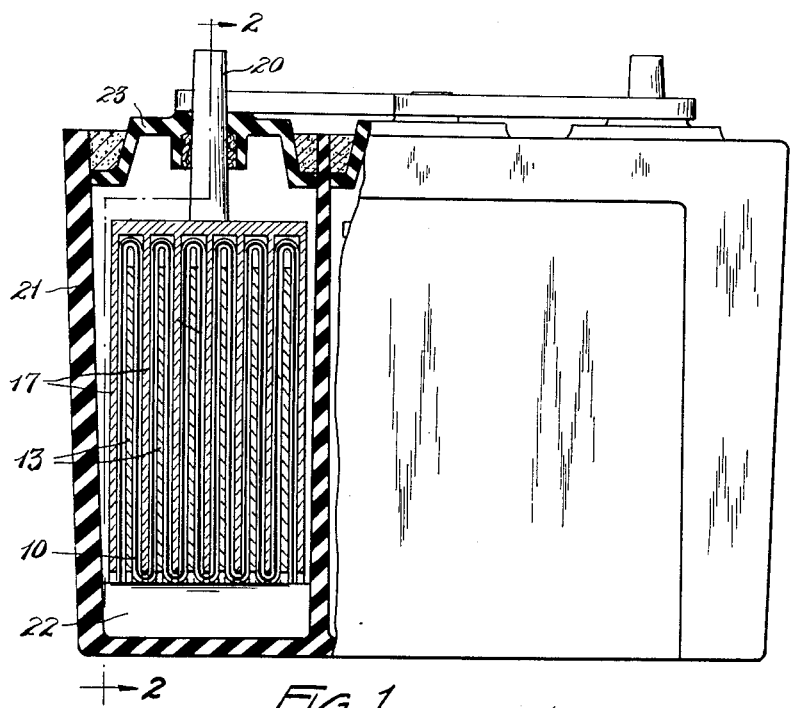

As is well known, separators of wood, rubber, or other suitable material in the form of individual plates or sections are inserted between the positive and the negative plates of each cell of a battery, but this common practice is departed from by this invention which, as previously stated, utilizes unit or continuous insulation between the positive and negative plates of the battery element. It is to be understood that by the term "battery element" as used herein is meant a plate and separator assembly in the battery cell (of which there may be one or any number in the battery). In carrying out the invention, any suitable separator material may be employed, but we prefer to use a strip of separator material made in accordance with the disclosures in the Reinhardt and Wells application Serial No. 698,860, filed November 20, 1933, (now Patent No. 2,052,490, granted Aug. 25, 1936) for Microporous diaphragm and method of making the same, and more particularly in the application of Leland E. Wells, Serial No. 735,719, filed July 17, 1934, for Process of making ribbed separators. In the first-mentioned application there is fully disclosed a storage battery separator consisting of a sheet of porous material coated on both sides with microporous rubber, and there is disclosed therein the preferred method of making the separator, which, in brief, is as follows: A strip of porous material of indeterminate length fed from a roll is passed one or more times successively through a jelling solution and then through a bath of latex or other bath having rubber in dispersion and then through a steam chamber to cause the latex to jell in the interstices of the fabric and on both sides thereof in the form of a thin layer or coating. In accordance with the process of the Reinhardt and Wells application, as the strip is passed through the apparatus in continuous fashion, suitable rib forming strips, such as latex-coated cords of fibrous material or strips of hard rubber composition, are laid on the coated fabric so as to form continuous ribs thereon suitably spaced apart as desired, and the whole is then wound on a drum which is subsequently conveyed to a vulcanizer where the jell is vulcanized so as to form microporous rubber in and on both sides of the strip. In accordance with said application, after the vulcanization is completed the drum is taken from the vulcanizer and the strip is unwound therefrom and cut into individual separators of a size suitable for insertion between the positive and negative plates of a battery.

Other forms of ribbing may be employed, as described in the said Wells application, wherein ribs integral with the strip are formed in continuous fashion by creasing and pleating portions of the strip as it goes through the apparatus. While insulating material, such as has just been described, may be employed, I do not wish to be confined thereto as other insulating material may be employed, such as material of the thread-rubber type, such as illustrated in Patent No. 1,243,370 granted to T. A. Willard, except that the thread-rubber strip will be made long enough to serve the purpose of unit insulation of the type herein contemplated.

Additionally, I may form the unit insulation out of a continuous strip of perforated rubber. This perforated strip, could alone constitute the unit insulation of a battery, or it might be used in conjunction with wooden strips or separators, since individual separators composed of a sheet of perforated rubber and a wooden insulator are commonly employed together.

In the event the unit insulation is molded with the sections in such relationship to each other that the unit can be assembled in the battery element, I may employ various materials from which the insulation is molded, as, for example, the jelly described in the Beckmann Patent No. 1,745,657, which jelly is a reticulous body with inter-aggregate pores of microscopic size occupied by the latex liquid and is capable of being used for molding separators, as described in the patent. Of course, in such case, after molding, the rubber will be vulcanized in a manner such as to prevent during vulcanization the escape of the liquid contained in the jelly, with the result that, after vulcanization, the rubber insulation will be permeated with pores of microscopic size, or, otherwise stated, will be microporous.

Referring now to the drawings, and first to Figs. 1 to 7, showing the strip of insulation material being folded for assembly in the battery element so as to extend over the plates of one group and under the plates of the other group, 10 represents a strip of insulation material which will be of suitable width and length, depending of course upon the size and number of plates in the cell. The strip, as herein illustrated, is preferably formed from a strip of porous material with its interstices filled and with both sides coated with microporous rubber, as described in the Reinhardt and Wells and in the Wells applications referred to above, and it is preferably provided with integral ribs 10a made in accordance with the said Wells application, the said ribs extending in parallel relationship lengthwise of the strip. At intervals, where the strip is to be folded over and under the edges of the plates, the strip is perforated, as shown at 11, the perforations occurring on the ribs and between the ribs, the perforations on the ribs being larger and of a size equal substantially to the thickness of the plates. Additionally, the strip is slotted, as indicated at 12, along one edge at alternate lines of perforations. On the other alternate lines of perforations, i. e., where the strip is folded so as to pass beneath the plates of one group (in this instance the negative plates), some of the perforations will be long enough to permit feet on the lower edges of the plates to extend through the insulation and engage the ribs of the bottom rest of the battery, as will subsequently appear. Next, the strip is folded in the manner indicated in Fig. 3, producing an accordion plaited effect. The unit insulation is now ready for assembly with the positive and negative plates. Preferably the positive group is first inserted in the folded insulation, Figs. 5 and 6 showing the positive group inserted therein, the positive plates indicated at 13 having lugs 14 joined to a strap 15 from which extends upwardly the usual post 16. As shown in these views, the lugs 14 extend through the slots 12, and, as illustrated in Fig. 6, the positive plates are inserted in the folded insulation so that the latter will extend over the top edges of the positive plates. Furthermore, since in charging a battery oxygen is evolved from the positive plates, the folding of the strip 10 is done in a manner such that when the positive plates are inserted in the folded insulation the ribs lie against the positive plates.

Next, the group of negative plates is inserted in the folded insulation by inserting the same with a downward circular motion to the left, as indicated in Fig. 7, which permits the group to interleave between the faces of the folded insulation with no distortion of either the plates or the insulation leaves. The plates of the negative group are designated 17, these plates having lugs 18 connected by a strap 19 from which extends the usual post 20.

When the groups of positive and the negative plates are inserted in the manner just stated, it will be noted that the folded insulation extends over the positive plates and under the lower edges of the negative plates. Accordingly, the folds over and under the interleaved plates are such that there is a line of perforations above each positive plate and beneath each negative plate with full open spaces underneath the positive plates, as is desirable to allow unrestrained downward passage of shedded material and fully open spaces above the negative plates as is desired in view of the fact that more gas is evolved from the negative than from the positive plates, while, as previously stated, the ribbing is next to the positive plates, as is desired because of the evolution of oxygen from these plates.

Figure 2:
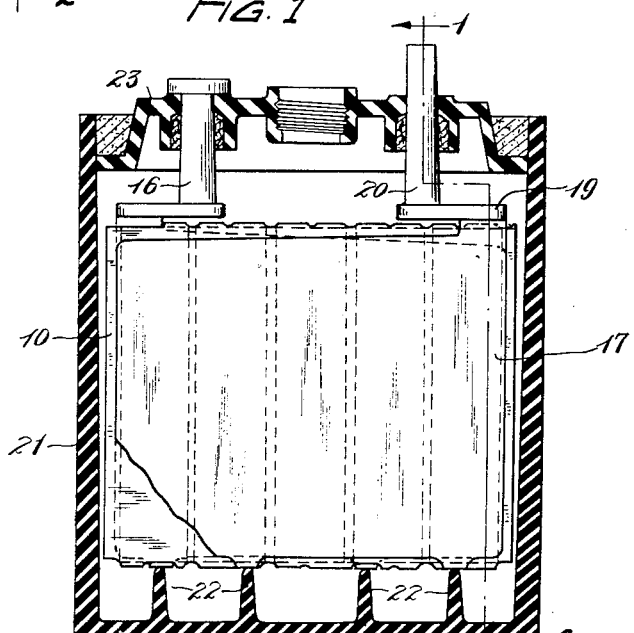
Fig. 2 is a sectional view through the battery substantially along the line 2—2 of Fig. 1.

The plate insulation assembly is now ready for insertion in a battery, and, when so assembled, it will appear as in Figs. 1 and 2. In these figures the battery case is designated 21, with the element resting on the usual ribs of the bottom rest 22 and with the posts 16 and 20 extending through the covers 23. The plates of both groups have the usual feet 24 at their lower edges which rest upon the ribs 22 of the bottom rest. In the case of the negative plates, the feet 24 will extend through slots in the fold lines of the unit insulation indicated in the drawings.

It will be seen from the above that the perforations in the strip at the several fold lines not only facilitate and make practical the folding of strips which are strong and stiff enough to stand service in storage batteries, but they also provide egress for the gases that rise during the charging and operation of the battery. Furthermore, by the use of the material in strip form including an inner layer of fabric coated on both sides with microporous rubber, inasmuch as the rubber when vulcanized is relatively stiff or hard, when the strip is folded along the lines of the perforations naturally the rubber breaks at the fold lines but the fabric acts as a hinge to permit the sections of the strip to be folded into substantial parallelism.

The advantages of the continuous or unit insulation may be summed up as follows:

1. Prevents top shorts. It is evident that since the separator passes over the top of the positive plates (and under the bottom of the negative plates) accumulation of material on top of the plates will not occur and therefore there can be no bridging over and short circuit. Further, failures sometimes occur from breakage of the top margin of the positive grid which bends up and eventually touches the negative strap. This is avoided by the present construction. Furthermore, this unit insulation minimizes the possibility of top shorts due to breakage of separators at their top edges by hydrometers, thermometers, filling devices, etc.

2. Minimizes sediment shorts. Although the separator is so arranged that the fall of loosened active material from the positive plate is not impeded, it does restrain the growth of negative material particularly at the lower edges of the plates. This feature has a tendency to minimize the treeing effect due to excessive sludge in the bottom of the container.

3. Simplifies and reduces cost of assembly. It is quite apparent that this unit insulation can be more readily and more quickly assembled than is the case with the usual construction involving the insertion of individual separators. Furthermore, the cost of manufacture per cell should be no more than for an equal number of individual separators, and the cost may be less since there is omitted the operation of cutting the individual separators to size. The operations of slotting and perforating the strip involve little cost since these operations can be performed by passing the strips continuously through a stamping machine.

Figure 8:
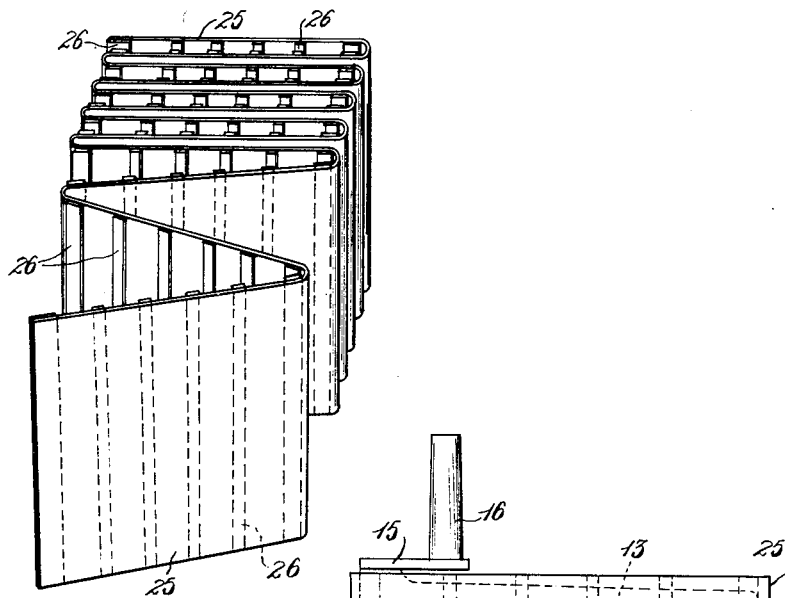
Fig. 8 is a view somewhat similar to Fig. 3, illustrating the unit insulation adapted to be assembled in a battery element with the insulation extending about the vertical or side edges of the plates.
Figure 9:
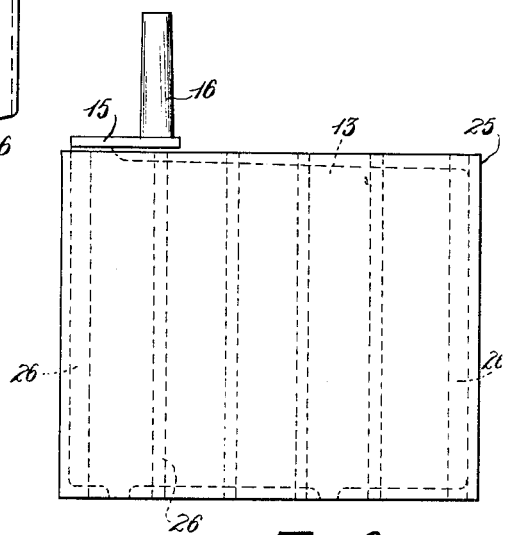
Fig. 9 is a view similar to Fig. 5, showing the unit insulation after the group of positive plates has been inserted therein.
Figure 10:
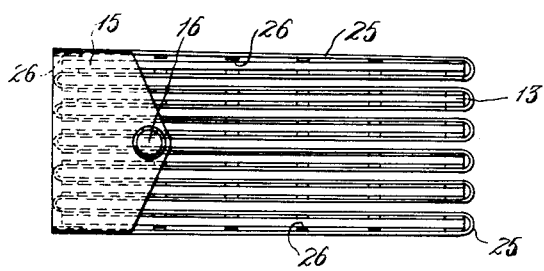
Fig. 10 is a top plan view of Fig. 9.

In Figs. 8, 9 and 10, I have shown unit insulation made in accordance with another form of the invention wherein a strip of separator material 25 is folded laterally so that it will extend about the side or vertical edges of the plates, but with the ribs 26 running crosswise of the strip so as to extend vertically in the battery, as is required. The strip is preferably microporous, as in the Reinhardt and Wells and in the Wells applications referred to above, and may be made in accordance with the disclosures of said applications. The ribs 26 may be formed integral with the strip, or they may be formed of rubber coated cords, rubber strips, or other rib material applied and vulcanized to the microporous strip 25. In this instance, the strip 25 need not be perforated along the fold lines but may be perforated to facilitate folding. With this form of insulation, the groups of positive and negative plates can be readily inserted laterally between the sections of the folded strip, Figs. 9 and 10 showing the group of positive plates inserted therein as before, with the ribs 26 next to or bearing against the sides of the positive plates.

When the battery element with the unit insulation is inserted in the battery, the insulation may rest on the ribs 22 of the bottom rest, as will also the plates of the two groups, it being understood that since the insulation does not extend under any of the plates, the plates of both groups can rest freely upon the ribs of the bottom rest, no special slotting of the insulation for this purpose being required.

This type of insulation possesses the principal advantages of that first described, although it does not possess all of them. On the other hand, the groups of plates can be readily slipped into opposite sides of the unit insulation and the assembly can perhaps be made easier than with the arrangement first described, and the lateral folding has the advantage of preventing shorts around the sides of the plates, and will also have a tendency to minimize the deleterious effects of misalignment of the plate groups.

While I have shown certain embodiments of the invention, changes may be made without departing from the spirit and scope of the invention, as, for example, in the materials employed, method of preparing the strips for folding, and the manner of assembly. I therefore aim in my claims to cover all modifications which do not involve a departure from the spirit and scope of the invention as defined in the appended claims.

Having thus described my invention, I claim:

1. In a storage battery comprising positive and negative plates, a unit insulation comprising a longitudinally ribbed strip folded transversely at intervals, the folded portions extending about edges of the plates and the straight portions lying between plates.

2. A unit insulation for storage battery plates comprising a strip of separator material longitudinally ribbed and folded transversely at intervals.

3. A unit insulation for storage battery plates comprising a strip of separator material ribbed lengthwise and folded transversely at intervals, said strip being perforated at the fold lines.

4. A unit insulation for storage battery plates comprising a strip of separator material having lines of perforations extending transversely across the same at intervals, and the strip being slotted inwardly from one edge at alternate lines of perforations.

5. A storage battery comprising a cell having a battery element therein composed of positive and negative plates, and insulation therebetween formed from a continuous strip of insulating material applied so that the fold lines are above the plates of one polarity and below the plates of the opposite polarity, there being openings at the fold lines.

6. A unit insulation for storage batteries, comprising a strip of separator material ribbed lengthwise, and having transverse perforations at the fold lines, said perforations severing said ribs.

7. A unit insulation for storage batteries comprising a strip of separator material ribbed lengthwise, said strip having transverse fold lines therein at intervals, said ribs being interrupted at the fold lines.

8. Unit insulation for storage battery plates comprising a strip of separator material composed of an inner sheet of fabric having its sides covered with thin layers of vulcanized microporous rubber, the strip being transversely folded back and forth at regularly spaced intervals and at the fold lines being relatively flexible as compared with the portions of the strip lying between the fold lines, due to said rubber layers being weakened at the fold lines.

SAMUEL W. ROLPH.